United States Patent [19]

van Oosten

[11] 4,186,090

[45] Jan. 29, 1980

[54] METHOD AND DEVICE FOR REMOVING A LIQUID FROM A MIXTURE OF LIQUID AND SOLID SUBSTANCES

[75] Inventor: Jacob van Oosten, Maarsen, Netherlands

[73] Assignee: B.V. Machinefabriek v/h Pannevis & Zh., Utrecht, Netherlands

[21] Appl. No.: 856,787

[22] Filed: Dec. 2, 1977

[30] Foreign Application Priority Data

Dec. 8, 1976 [GB] United Kingdom .............. 51227/76

[51] Int. Cl.² ............................................. B01D 33/04
[52] U.S. Cl. .................................... 210/77; 210/184; 210/400
[58] Field of Search .................. 210/77, 386, 400, 401, 210/184

[56] References Cited

U.S. PATENT DOCUMENTS

| 3,039,610 | 6/1962 | Black .................................. 210/184 |
| 3,459,122 | 8/1969 | Pastoors et al. ................. 210/386 X |
| 3,741,388 | 6/1973 | Takahashi ......................... 210/77 X |
| 3,960,732 | 6/1976 | Lippert et al. ................... 210/77 X |
| 4,038,028 | 7/1977 | La Roche ........................ 210/386 X |
| 4,038,193 | 7/1977 | Oosten .............................. 210/77 |

*Primary Examiner*—William A. Cuchlinski, Jr.

[57] ABSTRACT

A method and apparatus for removing a fluid from a mixture of a fluid and a solid substance. The mixtue is poured onto the upper run of a moisture-permeable conveyor belt conveying the mixture along a trajectory. In the first portion of the trajectory, the fluid flows out of the mixture by a draining effect, whereas in the last portion of the trajectory an increasing pressure is exerted on the mixture by mechanical means, while a relative displacement of the solid particles is performed.

13 Claims, 2 Drawing Figures

METHOD AND DEVICE FOR REMOVING A LIQUID FROM A MIXTURE OF LIQUID AND SOLID SUBSTANCES

The invention relates to a method of removing a liquid from a mixture of liquid and solid substances, the mixture being poured onto the upper run of a moisture-permeable conveyor belt, which serves to convey the mixture.

Such a method permits of removing the moisture only to a given extent from the mixture so that after the treatment of the mixture a comparatively large quantity of moisture is left in the mixture. In order to remove the residual moisture from the mixture, it is necessary to treat this mixture with the aid of further devices, for example, presses or the like. This results in a discontinuous method, in which different devices have to be employed so that the removal of the moisture from the mixture is a complicated and expensive operation.

The invention has for its object to provide a method of the kind set forth, in which the liquid can be removed in a simple, continuous manner from the mixture to an extent such that substantially no fluid will be left in the solid substance.

According to the invention this can be achieved in that along the first portion of the trajectory along which the mixture is displaced with the aid of the conveyor belt the fluid flows out of the mixture by a draining effect, whereas on the last portion of the trajectory an increasing pressure is exerted by mechanical agency on the mixture, whilst a relative displacement of the solid parts is performed.

The term "draining effect" has to be understood to mean herein that the moisture flows out of the mixture at least substantially under the action of the force of gravity without any influence being exerted on the disposition of the mixture on the conveyor belt by mechanical agency. According to a further aspect of the invention this draining effect may be enhanced by providing vacuum on the side of the conveyor belt remote from the mixture.

By using the method according to the invention a large quantity of fluid can be conducted away in a simple manner along the first portion of the path, whereas on the last portion of the path pressure is exerted on the mixture whilst simultaneously the disposition of the solid parts relatively to one another is disturbed in order to prevent the solid parts from forming an impermeable cake. Therefore, a large portion of the fluid will be removed from the mixture along the last part of the path so that by carrying out continuously the method embodying the invention the mixture is treated so that at least the major portion of the fluid is separated from the solid substance.

A particularly effective device for carrying out said method is obtained, when the device is provided with an endless belt passed around a drum and a pressing wall extending along part of the circumference of the drum, the relative locations of the drum and the pressing belt being such that the mixture can be displaced between the pressing belt and the endless belt surrounding the drum, whilst the endless belt and, if necessary, the pressing belt are driven so that the endless belt and the portion of the pressing belt extending along the circumferential surface of the drum are moving relatively to one another. In this way a device of simple structure can be obtained, which can be manufactured at low cost and whose maintenance will be cheap. The invention will be described more fully hereinafter with reference to an embodiment of a device in accordance with the invention shown schematically in the accompanying drawings.

Figures 1, 2:
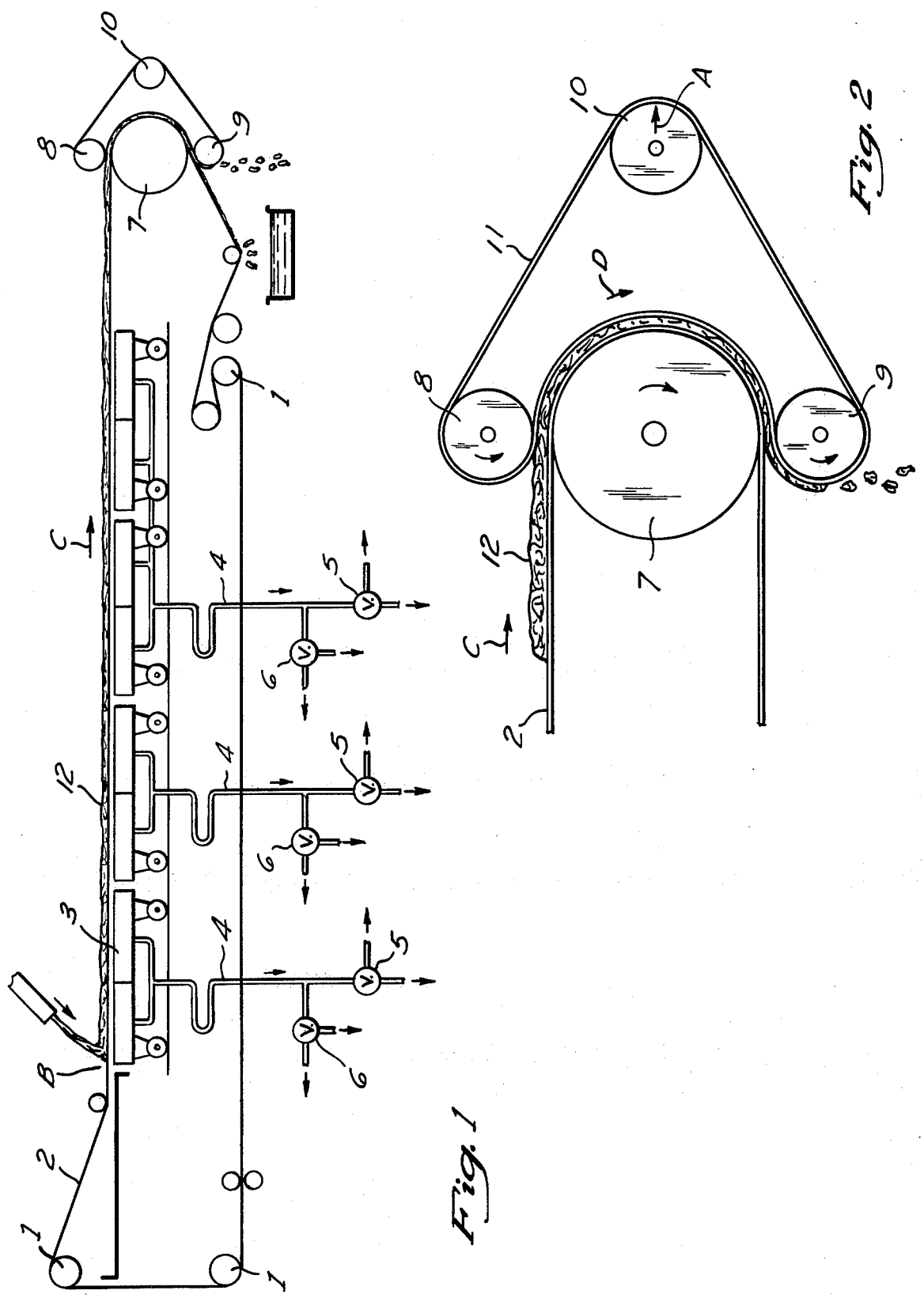
FIG. 1 shows a device embodying the invention.
FIG. 2 shows on an enlarged scale part of the device shown in FIG. 1 in accordance with the invention.

The device shown in FIG. 1 comprises a mosture-permeable conveyor belt 2 guided by a plurality of rollers 1, the upper run of said belt extending over a plurality of troughs 3 provided with sieves and adapted to reciprocate with the aid of a setting mechanism (not shown). The troughs 3 can be caused to communicate through a duct 4 and a flap 5 with a vacuum source and through the duct 4 and a flap 6 with the atmosphere. Near one end of the upper run a drum 7 having a comparatively large diameter serves for bending the upper run of the endless belt 2 towards the lower run.

At a given distance above the drum 7 a drum 8 of smaller diameter is disposed and beneath the drum 7 is also arranged a drum 9 having a smaller diameter than the drum 7. The distance between the outer circumferences of the drums 7 and 8 is larger than the distance between the outer circumferences of the drum 9 and that of the drum 7. At a given distance from the drum 7 is arranged a further drum 10 so that the centre axes of the drums 8, 9 and 10, extending parallel to the rotary axis of the drum 7 are located at the corners of a triangle, which will be particularly apparent from FIG. 2.

By means of setting members (not shown), for example, hydraulic setting cylinders the drum 10 is displaceable in the direction of the arrow A. Along the three drums 8, 9 and 10 is passed an endless pressing belt 11 so that part of this belt extends along part of the circumference of the drum 7.

The device described above operates as follows. At the beginning of the upper run of the endless belt 2, driven in the direction of the arrow C a mixture of a fluid and a solid substance is poured out at point B, from which mixture the fluid has to be removed. An initial removal of the fluid takes place along the first trajectory formed by the path along which the upper run of the belt moves in a horizontal direction as a result of drainage, that is to say, the flow of fluid by gravity across the moisture-permeable belt 2. This drainage is preferably enhanced by forming a vacuum in the troughs 3 during the period in which the troughs 3 are displaced synchronously with the upper run of the belt 2 in the direction of the arrow C. At the end of the stroke of the troughs 3 the vacuum is eliminated, after which the troughs 3 are returned to the initial position of the troughs 3 shown in FIG. 1, the cycle just described being then repeated. The belt 2 may be continuously driven with the aid of the driven drum 7.

The mixture thus partly freed of fluid is conveyed further by the belt 2 and at a given instant it will be located between the portion of the belt 2 around the drum 7 and the portion of the endless pressing belt 11 located at a given distance therefrom. The endless pressing belt 11 is driven by the drum 9 in a manner such that the portion of the belt 11 extending around the drum 7 is moving in the direction of the arrow D at a rate differing from the rate of the belt 2 or the circumferential speed of the drum 7, said rate slightly exceeding, for example, the circumferential speed of the drum 7 so that no accumulation of material will occur at the point where the material is fed in between the pressing belt 11 and the circumference of the drum 7. The tension of the pressing belt 11 may be further acted upon by adjusting the drum 10 in the direction of the arrow A.

Owing to the different speeds of displacement of the pressing belt 11 and the belt 2 a given relative displacement will occur between the belts 2 and 11 so that the pressure exerted on the mixture located between the belts 2 and 11 gradually increases in the direction of movement of the mixture, whilst in addition the solid particles of the mixture are constantly shifted in their relative places. In this way the fluid will be effectively pressed out of the mixture along the portion of the path where the mixture is moving between the belts 2 and 11, the fluid being allowed to escape across the fluid-permeable belt 11 and/or across the belt 2 and the fluid-permeable drum 7. The belt 11 is preferably permeable to fluid, whereas the drum 7 may be closed and may be provided with heating means so that the mixture 12 located between the belt 11 and the drum 7 can be heated to enhance the removal of the fluid from the mixture.

I claim:

1. A method of removing liquid from a mixture of liquid and solid, comprising the steps of:
   delivering the mixture onto an upper run of a liquid permeable conveyer belt, said upper run of belt conveying the mixture along a substantially straight path;
   draining liquid from the mixture through the upper run of said conveyer belt in a first portion of the path;
   exerting pressure which increases continuously in the direction of motion of the belt in a later curved portion of the path by means of a liquid permeable pressing belt pressing on the mixture to express additional liquid from the mixture; and
   causing shear of the solid by effecting relative displacement of particles of the solids in the mixture in said later curved portion of the path.

2. A method as claimed in claim 1 characterized in that in the last part of the trajectory the upper layers of the mixture are displaced in the direction of movement at a rate differing from the rate of the lower layers.

3. A method as claimed in claim 2 characterized in that the upper layers are displaced more rapidly than the lower layers lying on the conveyor belt.

4. A method as claimed in claim 1 wherein in the first portion of the trajectory the draining effect is enhanced by producing a vacuum on the side of the conveyor belt remote from the mixture.

5. A method as claimed in claim 1 wherein the mixture is heated along the last portion of the trajectory.

6. A device for carrying out the method according to claim 1, comprising:
   a liquid permeable conveyer belt having an upper run onto which a mixture of liquid and solid can be delivered and through which liquid can drain;
   a drum around which said conveyer belt passes;
   a pressing belt having a portion extending along and spaced from a portion of the circumference of said drum, whereby the mixture delivered onto the upper run of said drum can be advanced between said conveyer belt and said pressing belt, the device being constructed such that pressure exerted upon the mixture passing between said conveyer belt and said liquid permeable pressing belt increases continuously in the direction of movement of said conveyer belt; and
   means for driving said conveyer belt and said pressing belt at different speeds for effecting relative movement between the portion of said conveyer belt passing around the drum and the portion of said pressing belt extending along the circumference of said drum.

7. A device as claimed in claim 1 characterized in that the distance between the drum and the pressing belt near the point where the mixture is introduced between the pressing belt and the conveyer belt around the drum exceeds the distance between the drum and the belt near the point where the mixture moves from between the drum and the belt.

8. A device as claimed in claim 6, wherein the drive is such that the speed of propagation of the pressing belt exceeds that of the conveyor belt.

9. A device as claimed in claim 8 wherein the pressing belt is driven at a point located on the side of the drum where the mixture leaves the belt.

10. A device as claimed in claim 6, further comprising means for stretching the pressing belt.

11. A device as claimed in claim 1, wherein the sheath of the drum is impermeable and the pressing belt is permeable to fluid.

12. A device as claimed in claim 6, further comprising means for heating the drum.

13. A devie as claimed in claim 6, wherein beneath the upper run of the conveyor belt are arranged reciprocatorily movable chambers, in which vacuum can be produced.

* * * * *